United States Patent [19]

Anderson et al.

[11] Patent Number: 5,799,951

[45] Date of Patent: Sep. 1, 1998

[54] ROTATING SEALING DEVICE

[75] Inventors: Weston A. Anderson, Palo Alto, Calif.; John E. Richardson, Salt Lake City, Utah

[73] Assignee: Varian Associates, Inc., Palo Alto, Calif.

[21] Appl. No.: 754,946

[22] Filed: Nov. 21, 1996

[51] Int. Cl.[6] .................. F16J 15/40; F16J 15/43
[52] U.S. Cl. .............. 277/301; 277/302; 277/304; 277/347; 277/409; 277/410; 277/431
[58] Field of Search .................. 277/80, 135, 58, 277/1

[56] References Cited

U.S. PATENT DOCUMENTS

| | | | |
|---|---|---|---|
| 2,678,835 | 5/1954 | Clark, Jr. | 277/135 |
| 3,038,731 | 6/1962 | Milleron | 277/135 |
| 3,620,584 | 11/1971 | Rosensweig | 277/80 |
| 3,778,123 | 12/1973 | Hendler et al. | 277/135 |
| 4,407,518 | 10/1983 | Moskowitz et al. | 277/135 |
| 4,485,628 | 12/1984 | Jones | 277/135 |
| 4,577,340 | 3/1986 | Carlson et al. | 277/135 |
| 4,605,233 | 8/1986 | Sato | 277/135 |
| 5,118,118 | 6/1992 | Tadi et al. | 277/135 |
| 5,472,215 | 12/1995 | Gilbert | 277/135 |

*Primary Examiner*—William A. Cuchlinski, Jr.
*Assistant Examiner*—John L. Beres
*Attorney, Agent, or Firm*—Bella Fishman

[57] ABSTRACT

A rotating sealing device for sealing between a wall separating two mediums under substantially different pressure and a rotatable shaft utilizes a combination of a liquid meatal seal comprising at least one liquid metal ring and a shield means which prevents contamination of the metal ring by gases coming into contact with the liquid metal. Magnetic fluid seal, a ring of an oil material, or inert gas may be used as a shield to protect the liquid metal.

26 Claims, 3 Drawing Sheets

ROTATING SEALING DEVICE

BACKGROUND OF THE INVENTION

This invention relates to rotating seals between mediums of widely different pressures, and more particularly, to a rotating sealing device for a rotating shaft which extends through a housing wall of a vacuum tight chamber, preventing gas leakage through the wall.

A common problem experienced in high vacuum systems is the requirement to pass a rotating shaft to control a mechanism inside a high vacuum chamber, such as a rotating anode of an X-ray generating apparatus driven by an external motor, from a laboratory environment at atmospheric pressure without violation of the vacuum integrity of the chamber. One attempt to solve this problem in the past was to provide the shaft with lubricated O-ring seal to minimize friction between the shaft and the housing wall. However, O-rings wear quickly due to high rotational speeds during the operation, and both O-ring material and associated lubricants have high vapor pressure levels which may compromise, for example, the high voltage integrity of X-ray generating apparatus.

The use of liquid metal seals which utilize the phenomena of surface tension of liquid metals, as described in detail by Norman Milleron ("Utilization of the Surface Tension of Liquid Metals in Making High-Vacuum Seals", Transactions of the American Vacuum Society Symposium, 38–41, 1957), was another effort to improve the rotating seals. Contaminations of these seals by gases became the main disadvantage when used for sealing systems from air or other oxidizing gases, since a liquid metal which forms sealing elements of such seals tends to oxidize, thereby shortening the useful lifetime of the seal.

Still another approach to solve the above-mentioned problem was to utilize a magnetic fluid as a sealing element, whereby the magnetic fluid was formed into rings between a shaft housing and a rotatable shaft. The conventional magnetic fluid consists of an oil with colloidal magnetic particles suspended in it. According to the conventional designs, the liquid rings are maintained between the shaft and the housing by a series of permanent magnets. Such rotating seals have been described, for example, in the U.S. Pat. Nos. 3,620,584, 4,200,296, 4,293,137, 4,577,340, 4,598, 914 and 4,605,233. The prior art systems disclosed in these patents being advantageous in certain respects, are not capable of achieving extremely low pressure (of about $10^{-9}$ Torr) without intermittent or continuous pumping on a lower pressure side of the seal. The low pressure within a sealed system is limited by the finite vapor pressure of the magnetic fluid. Moreover, some gases being dissolved in the magnetic fluid on a higher pressure or atmospheric side of the seal are moving through the seal to the lower pressure side either via diffusion or by circulation of the fluid under the influence of the shear when the shaft is rotated. The system is also limited to operations at relatively low temperatures since the vapor pressure of the magnetic fluid increases rapidly with temperature increases.

SUMMARY OF THE INVENTION

It is a general object of this invention to provide a reliable rotating sealing device which has a prolonged lifetime.

It is an object of this invention to provide a rotating sealing device capable of operating at elevated temperatures and being applicable, for example, to high-performance X-ray generating apparatus.

It is another object of this invention to provide a rotating sealing device to seal a gap between a rotatable shaft and its housing which utilizes a liquid metal seal being protected against contamination by gases.

It is a further object of this invention to provide rotating sealing device which is capable of separating two mediums under substantially different pressure utilizing a combination of a liquid metal seal and a magnetic fluid seal.

Rotating sealing devices for sealing between a wall separating two mediums, each at substantially different pressure and a rotating shaft penetrating therethrough, embodying this invention, with which the above and other objects can be accomplished, at least one ring of a liquid metal between the rotating shaft and its housing incorporated to the wall comprises a liquid metal seal having a shield adjacent to the liquid metal which is placed within one of the mediums at higher pressure for prevention of contamination of the liquid metal seal by gases within this medium. The liquid metal should have a very low solubility for most gases and being capable of operation at elevated temperatures while maintaining low vapor pressure. The liquid metal may be, for example, gallium, a gallium eutectic or other alloys of gallium. The liquid metal seal should be protected from contamination by a magnetic fluid or an oil, such as a silicon oil, which are used as a barrier to water vapor which in combination with oxygen can react with gallium. According to an alternative embodiment, an inert gas may be used to isolate the liquid metal or metal alloy of the liquid metal seal from reactive gases.

The foregoing and other objects and advantages of the invention will appear from the following description. In the description, reference is made to the accompanying drawings which form a part hereof, and in which there are shown by way of illustration preferred embodiments of the invention.

DESCRIPTION OF THE PREFERRED EMBODIMENTS

Figure 1:
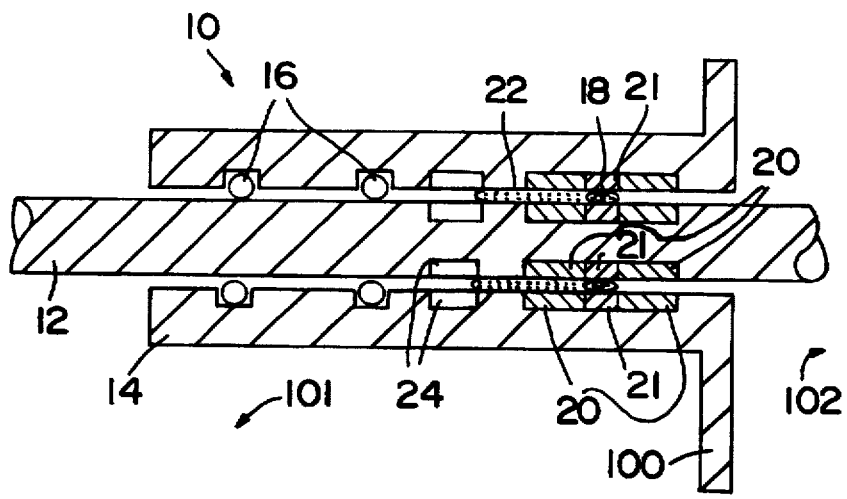
FIG. 1 is a schematic cross-sectional illustration of a rotating sealing device according to a first embodiment of this invention utilizing a ring of liquid gallium and a ring of oil.

With reference to FIG. 1 which illustrates rotating sealing device 10 according to a first embodiment of this invention, rotating shaft 12 penetrates vacuum enclosure 100, extending from a higher pressure region 101 into a lower pressure region 102. The higher pressure region 101 may be at atmoshperic pressure, while the lower pressure region 102 may be at a pressure below $10^{-6}$ Torr. Shaft 12 has hollow cylindrical housing 14 therearound which is secured to vacuum enclosure 100 to maintain vacuum integrity. Ball bearings 16 are provided to permit rotation of shaft 12 around its own axis while preventing the longitudinal motion of shaft 12 along its axis. Ring of liquid metal 18, such as liquid gallium, is contained in a gap between an outer surface of shaft 12 and inner surface of hollow cylindrical housing 14.

Liquid gallium, like many other liquid metals which can be used for sealing the gap between shaft 12 and housing 14, is not magnetic and therefore magnetic forces cannot be used to suspend it between shaft 12 and its housing. According to this invention, the ring of nonmagnetic liquid metal 18 is maintained along the axis of shaft 12 due to its surface tension and connects to the material which is wetted by the liquid metal. For this purpose, rings 20 (alternated by rings 21) are made of a material not wetted by liquid metal are incorporated on the inner surface of housing 14 and the outer surface of shaft 12 for suspending ring of liquid metal 18. Rings 21 are made of a material wet by the liquid metal. Rings 20 and 21 may be sputtered onto desired areas. Gallium wets such metals as clean tungsten and molybdenum, and does not wet carbon in various forms, titanium dioxide, beryllium and alumina. Shaft 12 and its housing 14 may be fabricated from stainless steel, while rings 18 may comprise gallium or its alloys. In the preferred embodiment gallium is chosen due to its very low vapor pressure, which equals $10^{-5}$ Torr at 771° C. and drops rapidly at lower temperatures. Its melting point is about 30° C. and its boiling point at atmospheric pressure is about 2400° C., which provides a wide range in temperature in which gallium remains a liquid with very low vapor pressure.

By heat treating the steel portion of the outer surface of shaft 12 and inner surface of housing 14 in wet hydrogen or dissociated ammonia at 1000°–1110° C. for 20 minutes one obtains a green chromic oxide on the surface. Gallium or gallium eutetics will not wet this oxide surface and do wet the clean stainless steel surfaces. This technique may be used to produce a series of concentric rings on the outer surface of shaft 12 and on the inner surface of the housing that alternate retain and reject gallium.

To prevent oxidation of the liquid metal by gases such as oxygen and water vapor that may be present on the atmospheric side of the sealing device, which is defined in FIG. 1 as higher pressure region 101, a protective barrier is provided in the form of a ring of silicon oil 22 which has extremely low solubility for water or oxygen. Ring of oil 22 is contained in the gap between shaft 12 and housing 14 and is confined axially by ring of liquid metal 18 on one side and another ring 24 of a material having a very low surface energy and capable of acting like a non-wetting barrier to the oil. Examples of such material includes Nyebar (which is manufactured by Nye Lubricants, Inc. of New Bedford, Mass., under this tradename) and other solid fluorinated polymers.

Figure 2:
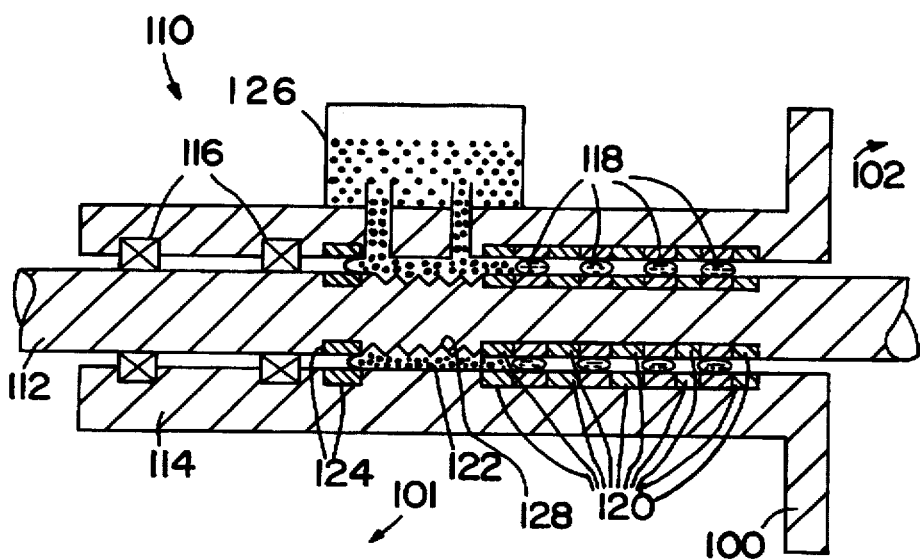
FIG. 2 is a schematic cross-sectional illustration of another rotating sealing device according to a second embodiment of this invention using a plurality of rings of liquid gallium and a ring of oil.

FIG. 2 shows rotating sealing device 110, according to a second embodiment of the present invention, between rotating shaft 112 which penetrates vacuum wall 100 separating higher pressure region 101 and lower pressure region 102. According to this embodiment, hollow cylindrical housing 114 attached to wall 100 surrounds shaft 112 with a narrow gap therebetween, and ball bearings 116 are provided to permit rotation of shaft 112 around its axis while preventing the longitudinal motion of shaft 112 along its axis. A plurality of liquid metal rings 118 are provided in this gap.

The maximum pressure differential $P_{max}$ supported by a single section liquid metal, as illustrated in FIG. 1, is given by:

$$P_{max}=2\gamma/d,$$

where $\gamma$ is the coefficient of surface tension and d is a distance defining the gap between the outer surface of the shaft and the inner surface of the hollow housing.

The value of the maximum pressure differential should exceed all pressure components within a single section liquid metal.

$$P_{max}>P_1+P_2+P_3,$$

where $P_1$ is the gas pressure differential on the opposite sides of the wall, $P_2$ is the additional pressure caused by gravity acting on the head of the liquid metal and $P_3$ is the additional pressure caused by the centrifugal force of the liquid metal due to the angular rotation of the shaft.

If the seal is in the horizontal position, $$P_2=\rho g D,$$

where $\rho$ is the density of the liquid metal, g is the acceleration of gravity and D is the diameter of the shaft.

$P_3$ due to the centrifugal force is given by:

$$P_3=\rho\omega^2 D d/2,$$

where $\omega$ is the angular speed.

If the liquid metal is gallium, the gap $d=2.54\times10^{-3}$ cm, the shaft diameter D =1.27 cm and angular velocity $\omega=5000$ rpm, one obtains $P_{max}=496{,}000$ dynes/cm$^2$, $P_2=7{,}590$ dynes/cm$^2$ and $P_3=886$ dynes/cm$^2$. This means that $P_1$ must be less than 486,000 dynes/Cm$^2$, or about 0.486 atmospheres. Thus, for a tight seal that will safely hold off an atmosphere of gas pressure, at least three sections of the liquid metal rings are required.

Rotating sealing device 110 according to the second embodiment of this invention has four rings of liquid metal 118 separated by rings 120 of nonwetting material as described with reference to the first embodiment of the invention. Circulating ring of silicon oil 122 is used to protect the liquid metal from oxidation by atmospheric gases such as oxygen and water vapor. Although the solubility of oxygen or water is extremely small in silicon oil, any trace of them can be removed by circulating the oil through drying tank 126 that may contain a drying agent such as sodium metal. Spiral grooves 128 formed on the outer surface of shaft 112 may be used to pump oil 122. Oil 122 is protected from leaking out by rings 124 of a fluorinated polymer coating such as Nyebar applied on both shaft 112 and housing 114, as explained with reference to the first embodiment of the invention.

Figure 3:
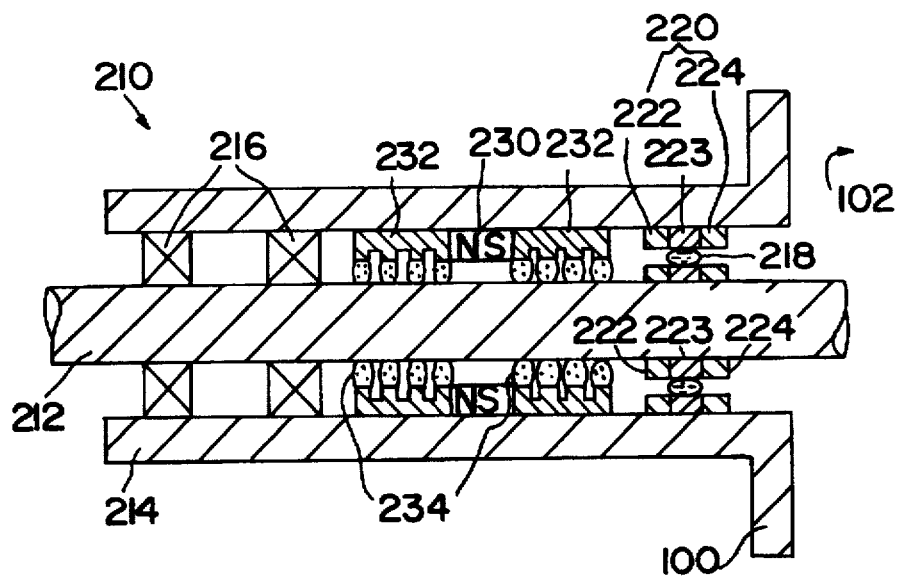
FIG. 3 is a schematic cross-sectional illustration of still another rotating sealing device according to a third embodiment of this invention using a combination of a liquid metal seal and a magnetic fluid seal.

FIG. 3 shows rotating sealing device 210, according to a third embodiment of the invention, between a rotatable shaft 212 which penetrates wall 100 separating higher pressure region 101 and lower pressure region 102. Hollow cylindrical housing 214, attached to wall 100, surrounds shaft 212 with a narrow gap therebetween, and ball bearings 216 are provided to permit rotation of shaft 212 around its axis while preventing its longitudinal motion. This embodiment provides a combination of a magnetic fluid seal, known also as a ferrofluid seal and a liquid gallium seal. A series of bar magnets or single ring magnet 230 with magnet pole pieces 232 produces a strong magnetic field in the multiple gaps between magnet pole pieces 232 and rotating shaft 212. Magnetic fluid 234 is captured and retained in these gaps by the magnetic forces within these regions. The magnetic field permits rotation of shaft 212 while blocking gas from flowing between shaft 212 and housing 214 from higher pressure region 101 into lower pressure region 102. The techniques of producing and utilizing magnetic fluid seals are known in the art and have been described in aforementioned U.S. Pat. No. 3,620,584, 4,200,296, 4,293,137, 4,577, 340, 4,598,914 and 4,605,233.

Each ring of magnetic fluid 234 is capable of supporting various pressure difference depending upon the field strength in the gaps, the gap widths and the type of magnetic fluid. If one ring of magnetic fluid 234 is supporting a pressure of about 0.2 atmospheres, the rotating sealing device comprises at least five such rings which are formed in tandem to hold off a total pressure difference of one atmosphere. Liquid metal protects region 102 against gases that dissolve in magnetic fluid 234 since these gases can diffuse through magnetic fluid 234 to lower pressure region 102 and are desorbed, especially during rotation of shaft 212, the gas transfer process is speeded up by the convection of the liquid during shear. Also, the partial pressure of the magnetic fluid is typically $10^{-8}$ Torr at 100° C. and increases rapidly with the temperature increasing. The liquid metal seal with liquid metal 218 captured between center rings 223 of three-piece ring 220 that are affixed by a leak-proof bond to the inner wall of housing 214 and correspondingly to the outer surface of shaft 212. Outer sections 222 and 224 of these three-piece rings 220 comprise a nonwetting material and central pieces 223 are made of a wetting material. When liquid metal 218 consists of liquid gallium, outer pieces 222 and 224 may consist of carbon, and central pieces 223 may consist of molybdenum.

Figure 4:
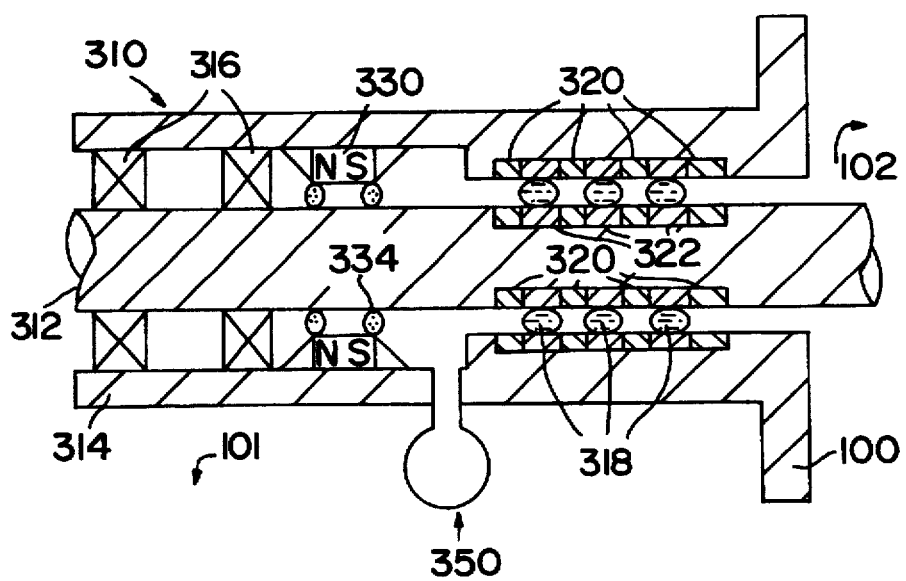
FIG. 4 is a schematic cross-sectional illustration of still another rotating sealing device according to a fourth embodiment of this invention utilizing a combination of a liquid metal seal with a plurality of liquid metal rings and a magnetic fluid seal.

FIG. 4 shows rotating sealing device 310, according to a fourth embodiment of the invention. Seal 310 is positioned between rotating shaft 312 which penetrates wall 100 separating higher pressure region 101 and lower pressure region 102. Hollow cylindrical housing 314, attached to wall 100, surrounds shaft 312 with a narrow gap therebetween, and ball bearings 316 are provided to permit rotation of shaft 312 around its axis while preventing its longitudinal motion. A plurality of liquid metal sealing rings 318 are placed in tandem between shaft 312 and housing 314, held in positions along the axis of shaft 312 by providing wetting portions 322 and nonwetting portions 320. In order to protect liquid metal rings 318 from the side of the high pressure region 101 against contamination, two magnetic fluid sealing rings 334 are provided in a manner similar to the description given with reference to FIG. 3 with a permanent magnet 330. Getter pump 350 is used for absorbing or trapping any reactive gases that may pass the shield which comprises magnetic fluid rings 334.

Figure 5:
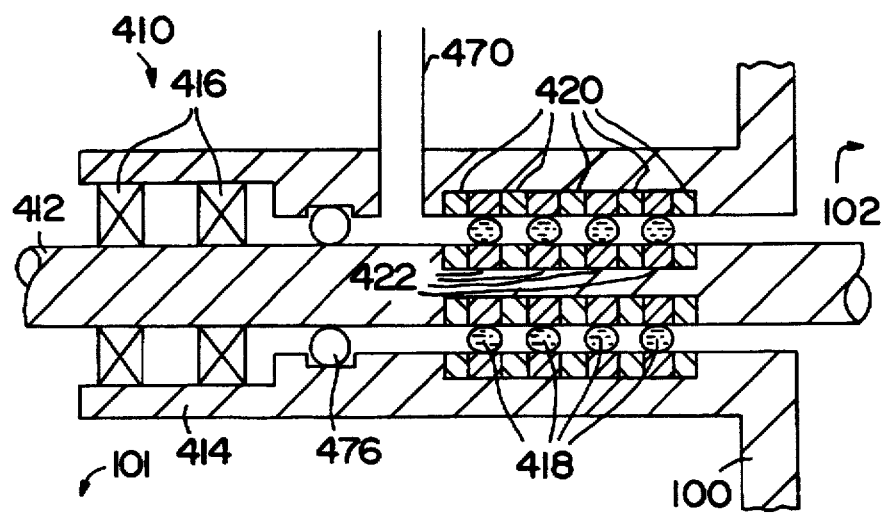
FIG. 5 is a schematic cross-sectional illustration of still another rotating sealing device according to a fifth embodiment of this invention utilizing a flow of inert gas to protect its liquid metal seal.

FIG. 5 shows rotating sealing device 410, according to a fifth embodiment of the invention, which is placed between rotating shaft 412 that penetrates vacuum wall 100 separating higher pressure region 101 and lower pressure region 102. Hollow cylindrical housing 414, attached to wall 100, surrounds shaft 412 with a narrow gap therebetween, and ball bearings 416 are provided to permit rotation of shaft 412 around its axis while preventing its longitudinal motion. Four liquid metal sealing rings 418 are placed in tandem between shaft 412 and housing 414, suspended in positions along the axis of shaft 412 by providing wetting regions 422 and nonwetting regions 420. In order to protect liquid metal sealing rings 418 from the side of the higher vacuum region against oxidation, a slow flow of inert gas is provided through tube 470 into the portion of the gap between shaft 412 and housing 414 between liquid metal sealing rings 418 and ball bearings 416. Ring seal 476 is provided between shaft 412 and housing 414 to prevent excessive gas loss. Examples of inert gas which may be used in this application include dry nitrogen, argon and other noble or inert gases. It is known that nitrogen does not react with gallium even at 1000° C. The gas may be provided from a high-pressure container through a flow regulator (not shown) of a known kind and in a known manner.

The present invention has been described with reference to a limited number of embodiments, but these illustrated embodiments are not intended to limit the scope or spirit of the invention. It is to be understood that modifications and variations may be made within the scope of the following claims.

What is claimed is:

1. A rotating sealing device for sealing between a wall separating a first and a second mediums, said first medium being at substantially higher pressure than said second medium, and a rotating shaft penetrating therethrough, wherein said shaft has a housing being in relative rotational relationship with said shaft incorporated to said wall, said rotating sealing device comprising:

a liquid metal seal having at least one ring of a liquid metal interposed between said shaft and said housing for forming a seal between said first and second mediums; and a fluid shield being adjacent to said liquid metal seal and placed within said first medium for preventing contamination of said liquid metal seal by gases contain therewith.

2. The rotating sealing device of claim 1, further comprising at least a pair of portions made of a nonwetting material for said liquid metal separated by a portion made of wetting material for said liquid metal, said alternating portions of wetting and nonwetting materials are disposed on an inside wall of said housing and on corresponding outside wall of said shaft facing said inside wall for suspending said liquid metal seal between said shaft and said housing.

3. The rotating sealing device of claim 2, wherein said liquid metal seal has a plurality of rings of a liquid metal interposed between said shaft and said housing along an axis of said shaft, a number of said rings of a liquid metal is selected in accord with the pressure differential of said first and second mediums and surface tension of said liquid metal.

4. The rotating sealing device of claim 3, further comprising a plurality of said wetting material portions, each wetting material portion of said plurality is placed between a pair of said nonwetting material portions, said alternating portions of wetting and nonwetting materials are disposed on an inside wall of said housing and on corresponding outside wall of said shaft facing said inside wall.

5. The rotating sealing device of claim 4, wherein each said ring of a liquid metal is suspended between a pair of respective wetting material portions of said housing and said shaft.

6. The rotating sealing device of claim 1, wherein said shield is a magnetic fluid seal having at least one ring of a magnetic-fluid material and permanent magnets for suspending said magnetic-fluid ring adjacent to said liquid metal seal.

7. The rotating sealing device of claim 1, wherein said shield is a ring comprising a viscous material.

8. The rotating sealing device of claim 7, further comprising an additional sealing ring placed between said shaft and said housing within said first medium for restricting said viscous material to an area adjacent to said liquid metal seal.

9. The rotating sealing device of claim 8, wherein said viscous material comprises a silicon oil.

10. The rotting sealing device of claim 1, wherein said shield comprises an inert gas.

11. The rotating sealing device of claim 10, further comprising a gas circulator for introducing said inert gas into a gap between said shaft and said housing to permit said gas to flow adjacent to said liquid metal seal.

12. The rotating sealing device of claim 11, further comprising an additional sealing ring placed between said shaft and said housing within said first medium for restricting said gas flow to an area adjacent to said liquid metal seal.

13. The rotating sealing device of claim 12, wherein said inert gas is nitrogen.

14. The rotating sealing device of claim 13, wherein said liquid metal is selected from the group consisting of liquid gallium, eutectic of gallium and gallium alloys.

15. The rotating sealing device of claim 14, wherein said nonwetting material being selected from a group consisting of greened stainless steel, beryllium, alumina, titanium dioxide and carbon, and said wetting material being selected form a group consisting of molybdenum, clean stainless steel and tungsten.

16. The rotating sealing device of claim 15, wherein said first medium is under an atmospheric pressure, and said second medium is under the pressure below $10^{-6}$ Torr.

17. A rotating sealing device for sealing between a wall separating a higher pressure region and a lower pressure region, and a rotating shaft penetrating therethrough, wherein said shaft has a housing being in relative rotational relationship with said shaft and incorporated to said wall, said rotating sealing device comprising:

a liquid metal seal having at least one ring of a liquid metal interposed between said shaft and said housing for forming a seal between said higher pressure and lower pressure regions; and a magnetic fluid seal being adjacent to said liquid metal seal and disposed within said higher pressure region, said magnetic fluid seal having at least one ring of a magnetic fluid interposed between said shaft and said housing for protecting said liquid metal seal from contamination by gases of said higher pressure region.

18. The rotating device of claim 17 further comprising respective portions of materials which are nonwetted and wetted for said liquid metal, each said wetted material portion is bordered by to a pair of portions of said nonwetted material, said alternating portions of wetted and nonwetted material are disposed on an inside wall of said housing and on corresponding outside wall of said shaft for suspending said at least one ring of said liquid metal between said shaft and said housing.

19. The rotating device of claim 18, wherein said magnetic fluid seal further comprising permanent magnets for suspending said at least one magnetic fluid ring between said shaft and said housing.

20. The rotating device of claim 18, further comprising a plurality of rings of said liquid metal interposed between said shaft and said housing, each ring of said plurality supports a pressure differential no greater than ΔP, where ΔP is calculated according to the equation:

$$\Delta P = 2\gamma/d,$$

wherein $\gamma$ is the coefficient of surface tension of said liquid metal, d is the distance between the inside wall of the housing and the outside wall of the shaft.

21. The rotating device of claim 19 further comprising a plural number of rings of said magnetic fluid interposed in tandem between said shaft and said housing and disposed within said higher pressure region.

22. A method for providing a rotating seal between a wall separating a higher pressure region and a lower pressure region, and a rotating shaft penetrating therethrough, wherein said shaft has a housing being in relative rotational relationship with said shaft and incorporated to said wall, said method comprising the steps of:

providing respective portions of materials nonwetting and wetting to a liquid metal on an inside wall of said housing and on an outside wall of said shaft, wherein each portion of wetting material is adjacent to a respective portion of said nonwetting material;

suspending at least one ring of liquid metal between said portions of wetting materials of said shaft and said housing; and protecting said at least one ring of liquid metal against contamination by gases contain within said higher pressure region by providing a shield between said ring of liquid metal and said higher pressure region.

23. The method for providing a rotating seal of claim 22, wherein said step of protecting said at least one ring of liquid metal further comprising a step of suspending a magnetic fluid ring adjacent to said liquid metal seal within said higher pressure region.

24. The method for providing a rotating seal of claim 23, wherein said magnetic fluid ring is maintained within a gap between said housing and said shaft by a magnetic field of permanent magnets.

25. The method for providing a rotating seal of claim 22, wherein said shield is a viscose material which is disposed adjacent to said liquid metal seal within said higher pressure region.

26. The method for providing a rotating seal of claim 22, wherein said step of protecting said at least one ring of liquid metal further comprising a step of introducing an inert gas flow within said higher pressure region in a space between said liquid metal ring and a sealing ring, said sealing ring is introduced in a gap between said housing and said shaft for restricting said inert gas flow.

* * * * *